United States Patent
Pond

(10) Patent No.: US 10,768,056 B1
(45) Date of Patent: Sep. 8, 2020

(54) TRIPLE POINT WATER CELL WITH STORAGE VOLUME FOR IMPROVED LONG TERM PERFORMANCE WHILE RETAINING DURABILITY AND EASE OF USE

(71) Applicant: Stanley Pond, Berthoud, CO (US)

(72) Inventor: Stanley Pond, Berthoud, CO (US)

( * ) Notice: Subject to any disclaimer, the term of this patent is extended or adjusted under 35 U.S.C. 154(b) by 0 days.

(21) Appl. No.: 16/773,664

(22) Filed: Jan. 27, 2020

(51) Int. Cl.
*G01K 15/00* (2006.01)
*C02F 1/22* (2006.01)
*C02F 1/04* (2006.01)

(52) U.S. Cl.
CPC ............. *G01K 15/002* (2013.01); *C02F 1/04* (2013.01); *C02F 1/22* (2013.01); *C02F 2201/002* (2013.01); *C02F 2301/06* (2013.01)

(58) Field of Classification Search
CPC . C02F 1/008; G01N 25/66; G01N 2201/1211; G01N 1/22; G01N 25/14; G01N 29/02
USPC ............. 210/741; 374/10, 16, 208, 100, 1, 3
See application file for complete search history.

(56) References Cited

U.S. PATENT DOCUMENTS

| | | | | |
|---|---|---|---|---|
| 3,453,864 A | * | 7/1969 | Chiu | G01N 25/18 374/21 |
| 4,009,013 A | * | 2/1977 | Schrawer | F25J 1/001 62/601 |
| 4,765,143 A | * | 8/1988 | Crawford | F01K 3/00 60/651 |
| 5,219,225 A | * | 6/1993 | Ball | G01K 15/002 374/1 |
| 5,385,027 A | * | 1/1995 | Longsworth | F25D 3/12 62/51.1 |
| 6,260,361 B1 | * | 7/2001 | Tyree, Jr. | F17C 7/00 62/54.1 |
| 6,293,695 B1 | * | 9/2001 | Schmermund | G01K 15/002 374/1 |
| 6,324,894 B1 | * | 12/2001 | Kang | G01K 15/002 73/25.03 |
| 6,939,035 B2 | | 9/2005 | Machin | |
| 7,520,670 B2 | * | 4/2009 | Schwegman | F26B 5/06 215/200 |

(Continued)

FOREIGN PATENT DOCUMENTS

| | | |
|---|---|---|
| CN | 104251750 A | 12/2014 |
| JP | 360006836 A * | 1/1985 |

(Continued)

OTHER PUBLICATIONS

"The Water Triple Point Cell—An Optimal Realization" by John Tavener. Attached file: The_Water_Triple_Point_Cell_An_Oplimal_Realizalion.pdf.

(Continued)

*Primary Examiner* — Gail Kaplan Verbitsky
(74) *Attorney, Agent, or Firm* — Mark V. Loen

(57) ABSTRACT

The embodied invention is a compact TPW cell design with an upper storage volume that is used to remove contaminants from the TPW cell water. To remove contaminates, the TPW cell is inverted and rotated so that the cell body water completely drains into the upper storage volume through a transfer tube. Then the TPW cell is then rotated to vertical and cooled which transfers the cell body water back into the TPW cell by a sub-boiling process. The water impurities remain in the upper storage volume and the cell body water has been purified of contaminates.

10 Claims, 8 Drawing Sheets

(56) References Cited

U.S. PATENT DOCUMENTS

| | | | |
|---|---|---|---|
| 7,677,794 B2 | 3/2010 | Kim et al. | |
| 7,708,459 B2 * | 5/2010 | Nakano | G01K 15/005 |
| | | | 374/1 |
| 7,905,706 B1 * | 3/2011 | Liang | F01D 5/187 |
| | | | 416/96 R |
| 8,267,575 B2 | 9/2012 | Tavener | |
| 2016/0076949 A1 * | 3/2016 | Sabah | G01K 11/265 |
| | | | 374/3 |
| 2018/0224338 A1 * | 8/2018 | Umkehrer | G01K 15/005 |

FOREIGN PATENT DOCUMENTS

| | | | | |
|---|---|---|---|---|
| JP | 02003279204 A | * | 3/2002 | |
| JP | 02006138439 A | * | 6/2006 | |
| KR | 10057205081 B1 | * | 4/2006 | |

OTHER PUBLICATIONS

Attached file: Fluke-NIST_TPW.pdf.
Attached file: K29AB_DataSheet_Aug2016.pdf.

* cited by examiner

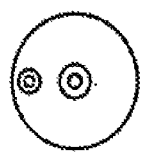 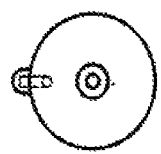 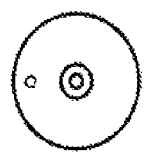 
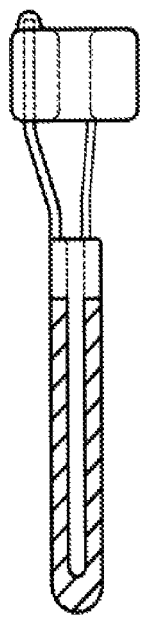 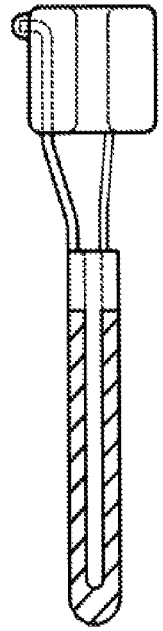 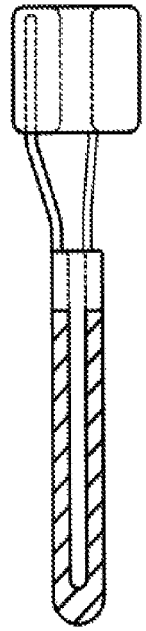 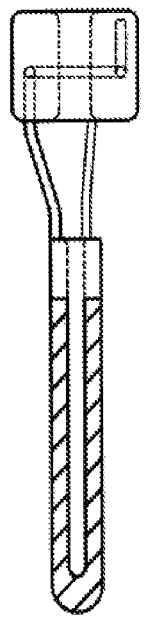
Fig. 4A    Fig. 4B    Fig. 4C    Fig. 4D

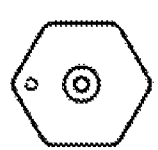 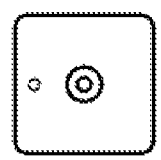 
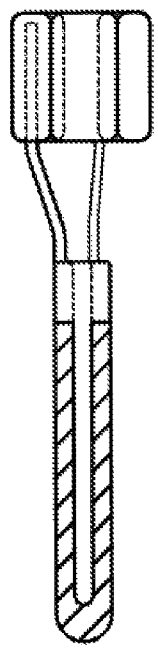 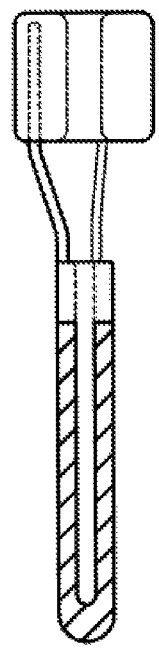 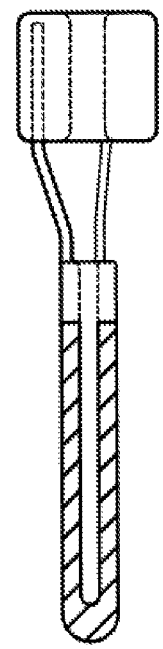
Fig. 5A    Fig. 5B    Fig. 5C

TRIPLE POINT WATER CELL WITH STORAGE VOLUME FOR IMPROVED LONG TERM PERFORMANCE WHILE RETAINING DURABILITY AND EASE OF USE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to instrumentation that provides a precise reference temperature for calibration purposes.

(2) Description of Related Art

BACKGROUND

The Triple Point of Water (TPW) is defined as the point at which water exists in equilibrium in the liquid, solid, and gaseous states. On the International Temperature Scale of 1990 (Per ITS-90), the Kelvin (K) is defined as 1/273.16 of the temperature of the TPW. The TPW establishes both the pressure and the temperature at which pure water, pure ice, and pure water vapor coexist in a stable equilibrium. This occurs at exactly 273.16 kelvin (0.01° C.) and at an absolute pressure of approximately 4.58 mm Hg.

The TPW serves as the foundation of modern temperature scales and TPW cells establish a close approximation of this defining fixed point for practical thermometer calibration in metrology laboratories around the world at the primary level (lowest temperature uncertainty available). Commercially available TPW cells can be used to realize the triple point of water with an uncertainty of better than 0.1 millikelvin (mK). Most TPW cells are constructed in one of two styles with dimensions and geometry commonly referred to as "Type A" or "Type B". The Type A design was originally developed by the US National Institute for Standards and Technology (NIST—formerly National Bureau of Standards) and the Type B design originated with the National Research Council (NRC) in Canada. Both types are very similar in design and operation and cells of both types are currently commercially produced by several manufacturers.

In operation, the TPW cell is usually prepared for accomplishing a "realization" of the TPW by cooling the cell from room temperature (by any of a number of methods) to a temperature as cold as the TPW temperature to a few degrees C. warmer than the TPW temperature. A maintenance bath and fluid are often used for this purpose. The maintenance bath fluid typically comprises a water/antifreeze mixture (a 90/10 water alcohol mix is often used) that is agitated by air bubbles, stirring or pumped circulation to maintain minimal temperature gradients. Cooling is often provided by solid state Peltier cooling modules or by mechanical refrigeration. Temperature stability over time is maintained with tight automation control.

When a maintenance bath is used, the TPW cell is submerged and supported in the maintenance bath about 0.5-1" below the bath fluid level. The re-entrant well (inner calibration tube) is allowed to flood with bath fluid when using a Type A cell while the stem of a Type B cell usually extends substantially above the bath fluid level and usually remains empty at this point of the process.

To prepare the TPW cell for use in calibration of thermometers, an ice mantle in the cell water must be created. After the TPW cell has been adequately cooled in the maintenance bath fluid (or by other means), the TPW cell is usually lifted out of the maintenance bath (either partially or completely) and the re-entrant well cleared of bath fluid (in the case of a Type A cell). Then additional heat is removed from the re-entrant well (by any of a number of methods) causing localized cooling of the water inside the cell body adjacent to the re-entrant well and eventual formation of ice surrounding (and adhered to) the re-entrant well. This process is referred to as 'forming an ice mantle'. Continued removal of heat from the re-entrant well causes additional thickness of ice to be formed. Thickness of the ice mantle is relatively unimportant but should be thick enough to provide sufficient time to accomplish the needed calibrations (5 to 15 mm is usually considered adequate). The ice mantle should envelop the entire re-entrant well up to within a few mm of the free liquid surface. Following formation of an ice mantle, the cell is typically again immersed in a maintenance bath with the fluid controlled at a temperature very close to the TPW (typically 0.007° C.+/−0.003° C.).

TPW cells are most frequently used to establish a calibration point for Standard Platinum Resistance Thermometers (SPRTs), providing an extremely low uncertainty in the temperature being realized. Following creation of an ice mantle, it is annealed by allowing it to sit in the maintenance bath for a few hours to a few days to allow relaxation of mechanical strains in the ice. The cell is then prepared for use in calibrating a thermometer by adding heat to the re-entrant well (usually done by inserting a room temperature rod one or more times as necessary) forming an "inner melt". The presence of an inner melt is easily identified by observing the ability of the ice mantle to freely rotate around the long axis of the re-entrant well. Temperature calibration of an SPRT is then performed by inserting an SPRT into the re-entrant well, allowing it to thermally equilibrate, and then taking resistance measurements to establish a calibration point of the curve of resistance vs temperature for the SPRT being calibrated.

Importantly, TPW cells providing the lowest uncertainty are made with glass envelopes comprised of an outer wall and a re-entrant well. Highly purified, degas sed water is sealed in the TPW cell envelope and air is nearly completely removed during the manufacturing process.

Careful attention must be given to achieve and maintain adequate degassing of the water, as well as isotopic composition and purity of the water when constructing high quality TPW cells.

It is important to provide a means of measuring the relative concentration of air in the TPW cell water sample (assuring adequate degassing) and assure the long term integrity (no micro cracks or pinholes) of the glass envelope. The Type A design includes a feature allowing entrapment of a portion of the contents of the cell above the liquid water line (water vapor a small amount of non-condensable gas) within a portion of the cell envelope by inverting the cell. As the cell is inverted the increasing hydrostatic head exerts increased pressure within the trapped volume. As the hydrostatic pressure is increased, the water vapor contained in the trapped volume condenses to liquid water ultimately collapsing the volume until only the non-condensable gas (air) remains as a bubble surrounded by liquid water. This feature is sometimes referred to as a "McLeod Gauge." The size of the remaining bubble as observed through the glass wall serves as a measure of the air in the cell. A bubble the size of a small pea has been reported to influence the temperature realized in a TPW by only 0.0003 mK.

Relating to purity of the cell water, concern has recently been raised regarding the suitability of borosilicate glass as an envelope for TPW cells, most particularly from the standpoint of leaching of components from the glass of the envelope (most particularly boron from borosilicate glass) into the high purity water contained within the envelope, thereby contaminating the water. High purity water is extremely aggressive in terms of dissolving materials used to contain it. In general, the higher the water purity, the more aggressive the action.

Some manufacturers have begun to produce TPW cells made of fused silica (quartz glass). High purity quartz glass is less likely to leach contaminants into high purity water. However, variations in quality of quartz glass does not assure elimination of this mechanism of contamination and the resulting change in the temperature realized by the TPW cell.

Others have worked to address concerns of pure water over a number of years. One technique for addressing or eliminating the effects of this mechanism of contamination is to provide a means of distilling the water into the cell body each time the cell is used to realize the TPW. An approach to doing this is described in "The Water Triple Point Cell—An Optimal Realization" by John Tavener. This TPW cell design replicates a decades old design and utilizes two connected volumes: a TPW Cell body nominally of Type A configuration that is connected to an additional volume or flask. Both the cell body and flask are capable of containing the entire liquid volume of the contents of the cell when oriented vertically and the liquid can be transferred from cell body to flask and isolated in the flask by orienting the cell in a nominally horizontal orientation then returning to a vertical orientation. It has been demonstrated that this apparatus and technique can be utilized to distill the water from the flask to the cell body, leaving contaminants in the flask where they do not influence the temperature realized by the TPW cell.

However, an apparatus with this configuration is widely accepted to be impractical from the standpoint of durability and with difficulty in routine use. In particular, the placement of the flask significantly away from the long axis of the cell body together with the mass of the water contained in the flask at the start of the distillation process makes the cell difficult to manipulate and support. In addition, the connecting glass tube between the TPW cell body and the external flask is inherently weak, and liable to break. Also, when establishing the ice mantle, a manual operation, the awkward connected flask arrangement is likely to cause a breakage accident. Development of this connected flask configuration was discontinued decades ago due to frequent breakage. No solution has previously been reported or sought.

Due to glass contaminants that leach into the water, current TPW cells lose the ability to assure the lowest uncertainty of temperature realization within a short period of time, possibly as short as 18-24 months. Since the TPW cell is sealed, there is no method that will allow replacement of the water. The TPW cell is no longer useful as a primary standard and must be replaced.

Standards with a long life are highly desirable not only from a replacement cost standpoint but from the standpoint of maintaining traceability to national/international standards as well as historical trend analysis. There is a need in the marketplace for a TPW cell that allows removal of water impurities from the TPW cell water, is a robust, easily manipulated design, and therefore provides for a longer useful cell life.

BRIEF SUMMARY OF THE INVENTION

The embodied invention is a two connected volume, compact, nominally coaxial TPW cell design that provides a method to remove contaminants from the TPW cell water. An upper volume provides a mechanism for transferring substantially all of the liquid water from the cell body and isolating the liquid water in the upper volume by inverting the cell (draining the water by gravity) followed by a series of rotations. Subsequent distillation of the water into the cell body by a sub-boiling process (with vapor moving through the connecting tube and condensing in the cell body) results in removal of contaminants from the water in the cell body.

BRIEF DESCRIPTION OF THE SEVERAL VIEWS OF THE DRAWING(S)

FIGS. 4A-4D show alternate positions for the dome and transfer tube routing.

FIGS. 5A-5C show alternative shapes for the storage volume with a central axis.

DETAILED DESCRIPTION OF THE INVENTION

Figures 1A, 1B:
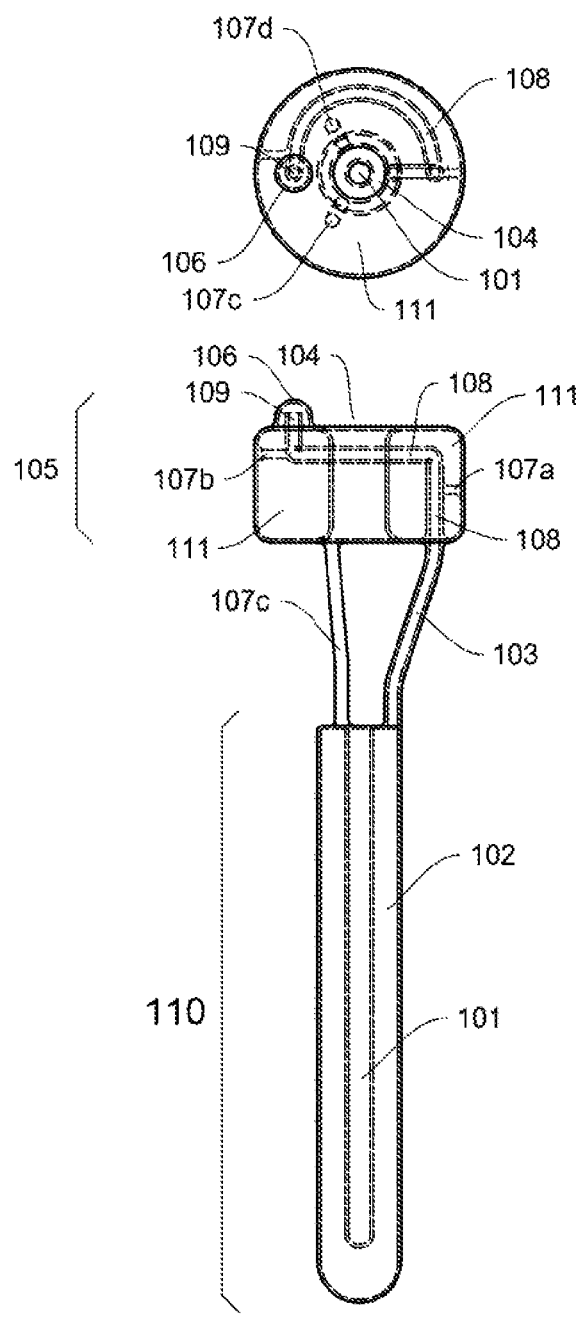
FIGS. 1A-1C show a front, top, and side view of the embodied TPW Cell with a connected, nominally coaxial volume with an annular geometry.

The figures parts include:
101 Re-Entrant Well (use to calibrate temperature sensor)
102 TPW Cell body volume (TPW Cell)
103 Lower Transfer Tube (Water-Vapor)
104 Annular Ring Opening
105 Upper Annular Volume Assembly (retains water Contaminants) or storage volume assembly
106 Dome
107a,b,c,d Support Rod
108 Upper Transfer Tube
109 Dome Transfer Tube
110 Cell Body
111 Annular volume or storage volume
201 TPW Cell Assembly
202 Bubbler Pump with bubbler stone
203 Peltier Solid State Cooler
204 Insulated tank 205 Temperature measurement
206 Coolant Fluid
207 Temperature Sensor being calibrated
301 Cell water liquid
302 Cell water vapor
303 Cell cooling
304 Liquid Fee Surface Level (visual water level)
601 McLeod gauge
602a,b Supports The embodied dual connected volume design provides the ability to transfer substantially all of the liquid water contained in the cell into the upper annual volume and isolate the liquid water subsequently distilling the water into the cell body by sub-boiling vaporization in the upper annular volume and condensation of the water in the cell body volume.

Figure 1C:
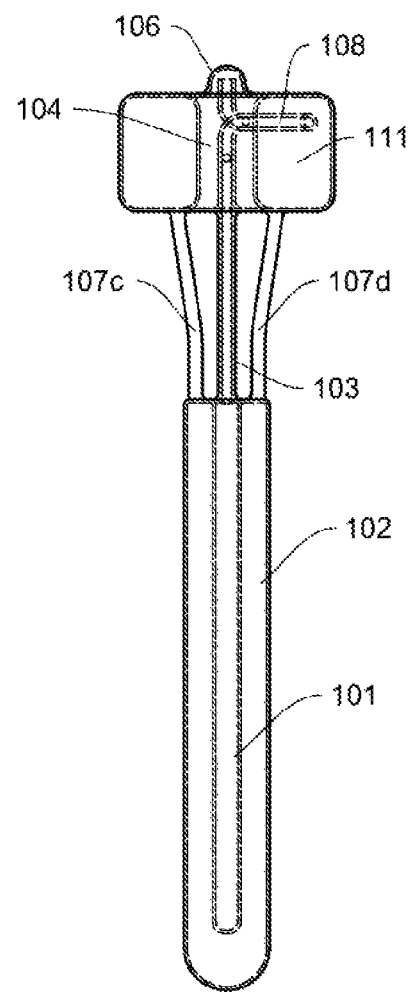

As seen in FIGS. 1A-1C, the embodied invention is a TPW cell body 110 that is connected to an upper annular volume assembly 105 by a transfer tube 103 and supporting rods 107c,d. The cell body comprises an inner re-entrant well 101 tube that is primarily used for thermometer calibration, and a cell body volume 102 surrounded by an outer tube. An annular ring opening 104 provides for insertion of a temperature sensor into the re-entrant well 101.

A lower transfer tube 103 is connected to an upper transfer tube 108 that is extended into the upper annular volume 111. The continuous transfer tube connects the cell body volume 101 and the upper annular volume 111. In this embodiment, a dome transfer tube 109 is added to the end of the upper transfer tube which terminates under a dome 106. The dome 106 provides a small additional volume to the annular volume 111. Ultimately, the continuous transfer tube is routed above the liquid free surface level of the water in the annular volume 111.

Support rods 107a,b are added to stabilize and support the transfer tube within the annular volume 111.

An important design feature of the embodied TPW cell is the location of a water reservoir volume 111 in the shape of an annular ring above and nominally concentric with the long axis of the cell body 110. The annular ring volume is connected to the cell body volume by the transfer tubes 103,108,109 which provides the ability for water movement between the two volumes. Liquid water is transferred from the cell body volume to the annular ring volume by inverting the cell and draining the liquid water into the annular volume. Rotation of the cell in multiple axes then isolates the liquid water in the annular volume. Submerging the cell body in a cooled maintenance bath while the annular volume remains in room ambient temperature conditions causes a vapor pressure difference between the two volumes and results in vapor movement from the upper volume to the cell body during distillation. This is important for purifying the cell body water during a periodic renewal.

Figure 2:
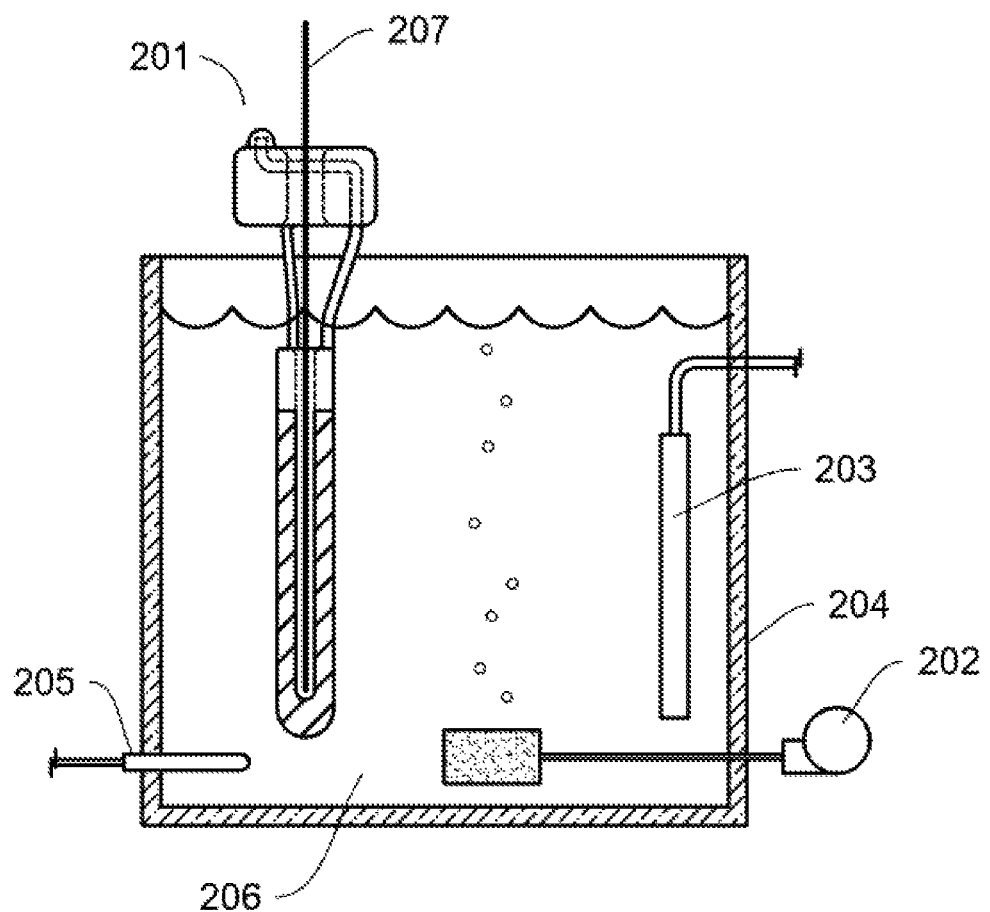
FIG. 2 shows the improved TPW cell in a maintenance bath set up to maintain the ice mantle.

FIG. 2 shows a schematic representation of a typical TPW cell in a maintenance bath. A TPW cell 201 (as shown in FIGS. 1A-1C) is submerged in the maintenance bath fluid 206 which is a water antifreeze mix contained in an insulated tank 204. The bath fluid temperature as measured by temperature sensor 205 is maintained at a constant 0.007° C. The bath fluid is agitated by stirring or an air bubbling/pump system 202 to avoid temperature gradients in the maintenance bath 206. A Peltier solid state cooling module 203 is utilized to provide cooling in the tank. As illustrated, a temperature sensor 207 is positioned in the re-entrant well of the TPW cell for calibration of the temperature sensor. Conveniently, the temperature sensor being calibrated passes through the annular ring opening for calibration.

Normally, the TPW cell remains in the maintenance bath while the TPW is being realized. Multiple thermometers may be calibrated using a TPW cell as long as the mantle remains adequately formed and is free to rotate about the re-entrant well.

As seen in FIGS. 3A-3F, the TPW cell water 301 is purified by a transfer into the annular volume and isolated in the annular volume by a sequence of rotations as illustrated. In order to minimize vapor pressure differences and their interference with the process described, the cell should be uniformly near room ambient temperature during the start of this process. Since there is virtually no air in the cell body volume or the annular volume, the water easily flows through the transfer tube with little resistance. The rotation markings in the drawings show an in-plane rotation with a line, and an out of plane (out of paper plane) rotation with a small circle. This is performed with the TPW cell removed from the maintenance bath.

Figure 3A:
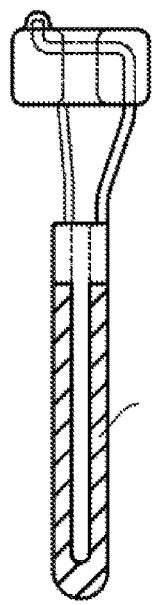
FIGS. 3A-3F show how the embodied invention is manipulated and rotated so as to allow the TPW cell water to move into an upper annular volume.
Figure 3B:
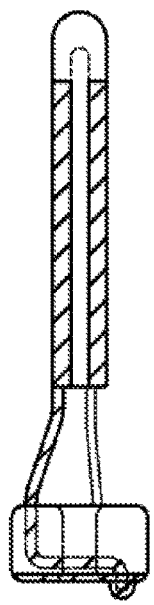
Figure 3C:
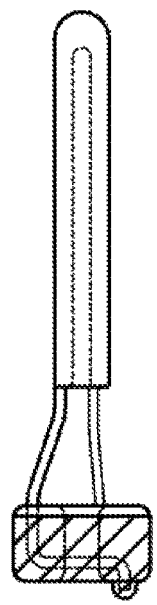
Figure 3D:
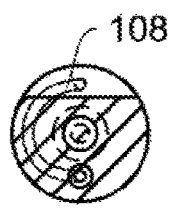
Figure 3D:
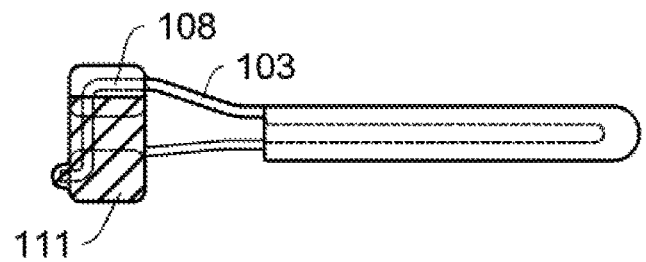

To start, as shown in FIG. 3A, the TPW cell is rotated about 180 degrees (FIG. 3B) and the cell water is allowed to completely drain into the upper annular volume (FIG. 3C). The TPW cell is then rotated about 90 degrees so that the cell liquid water is completely drained out of the lower transfer tube 103 and part of the middle transfer tube 108 by raising them above the water line in the annular volume (FIG. 3D). For clarity, FIGS. 3D and 3E show the left side view of the TPW cell, without the lower transfer tube or support rods.

Figure 3E:
Figure 3E:
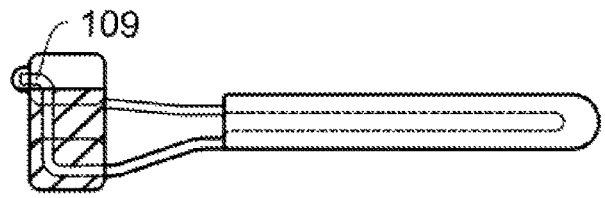

The cell is then rotated about 180 degrees about the long axis (CW as seen from the left side view FIG. 3E). The storage volume is tipped slightly downward or upward as needed to complete the water transfer with all the liquid water in transfer tube 108 and 109 substantially transferred into the annular volume. Any water wetting or stray drops remaining on the transfer tube or cell body volume is insignificant.

Figure 3F:
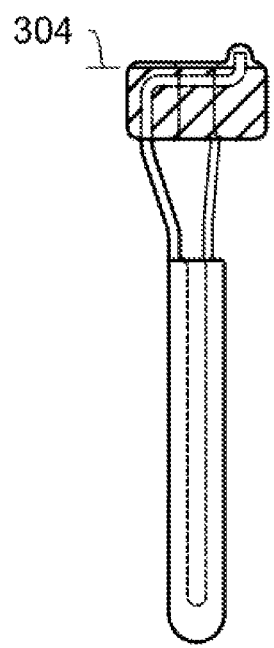

The cell is then rotated CW to vertical (FIG. 3F). The cell is then placed in a maintenance bath which removes heat 303 from the lower cell body 110 while the annular volume remains above the maintenance bath, nominally at room ambient temperature.

Notably, the liquid free surface level 304 is indicated. The exact level point is based on the fill volume of the cell body and the size of the annular volume.

Figure 3G:
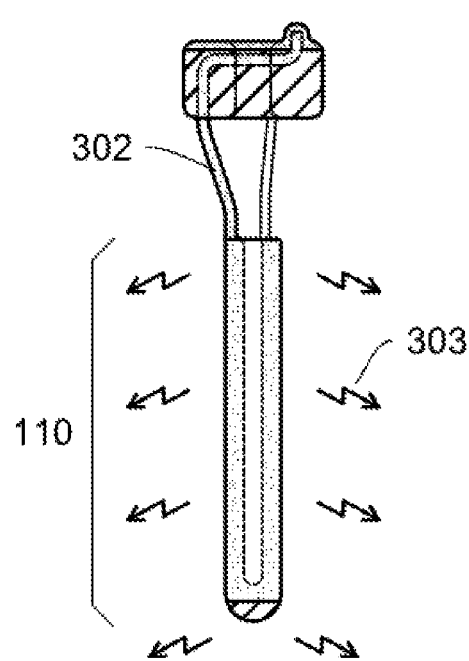
FIGS. 3G-3H show the TPW cell water sub boiling back to the TPW cell body.
Figure 3H:
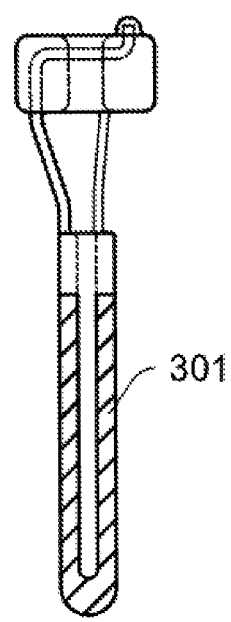

In FIGS. 3G-3H the TPW cell water vapor 302 transfers back into the cell body by sub boiling vaporization in the upper annular volume and condensation in the cooled cell body 303. The cell body cooling lowers the pressure in the cell body volume, and the cell water vapor slowly flows to the cell body and condenses to a liquid with the complete volume of liquid water being transferred to the cell body in a day or so. The contaminants formerly in the cell body water remain in the upper annular volume.

The upper transfer tube routing can vary as well as the placement and size of the dome on top of the annular volume, relative to the transfer tube entry into the annular volume. Preferably, the dome is on top of the annular volume and near the outer perimeter. Also, the dome is better placed opposite of the transfer tube entry point. This provides for a smaller annular volume and allows sufficient water gap to allow the cell body water to transfer into, and be completely isolated in, the annular volume during the transfer process.

The routing of the transfer tube may vary as illustrated in FIGS. 4A-4D, showing a top and side view. The dome is preferably above the liquid free surface, that is the visual waterline, when the cell body liquid water is transferred to the upper annular volume. The dome and transfer tube end must be extended above and remain above the waterline when the TPW cell is rotated after draining the water into the upper annular volume.

Alternately, the transfer tube is routed above the liquid free surface without the need for a dome, but at the expense of a larger annular volume. However, the use of a dome with a small extension of the transfer tube is a preferred embodiment.

Notably, the annular volume size in FIGS. 4A-4D is larger than FIGS. 1A-1C.

FIGS. 5A-5C show alternative shapes for the upper storage volume with a central axis. It is generally conceived that the storage volume is symmetric with a central hole aligned to the central axis, but this is not a strict requirement and non-symmetric shapes are alternatives. A dome could also be added as shown in FIGS. 4A-4D. However, a non-symmetric shape is problematic to make with glass. Notably, the shape in FIGS. 1A-1C is a preferred embodiment.

Figure 6B:
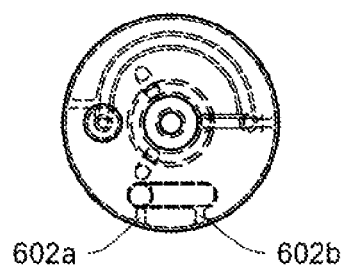
FIGS. 6A-6C show an additional water quality assurance gauge.
Figure 6A:
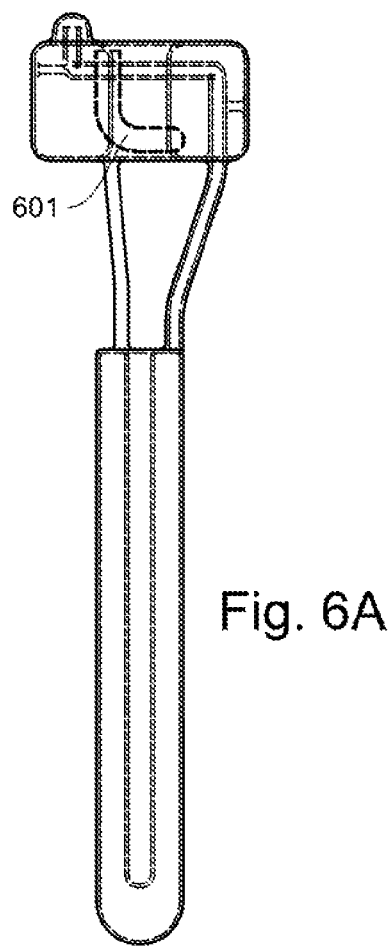
Figure 6C:
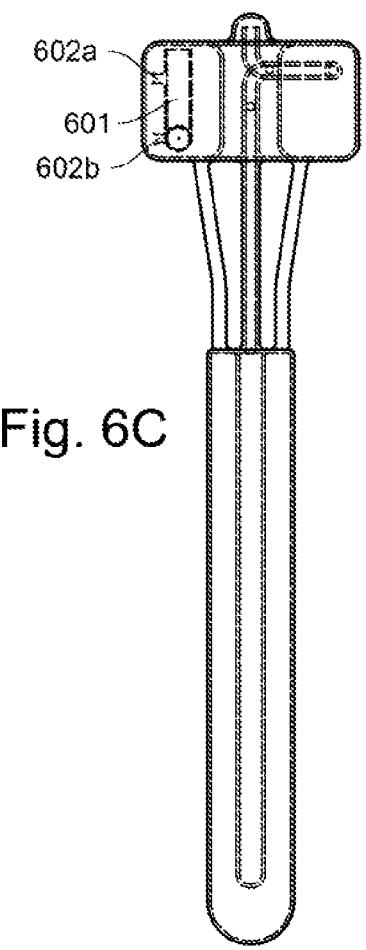

FIGS. 6A-6C show the addition of a McLeod gauge 601 within the storage volume. Supports 602*a*,*b* attach the gauge to the storage volume. The McLeod gauge is positioned to be below the free liquid surface of the storage volume when the cell is inverted and the cell liquid is completely drained from the cell body.

In designing the annular volume and transfer tube, part of the consideration is the ease of manufacture. For example, the upper transfer tube using curves is preferred over sharp corners as it will be stronger. Also, the position of the dome on the annular volume is more easily positioned near the perimeter rather than on the perimeter. Also, internal support rods are better if they are shorter.

In general, the transfer tube is arranged to allow decanting virtually all of the liquid water from the cell body into the upper volume when inverting the cell and then orienting the cell long axis horizontally and rotating the cell around the long axis. Realizations of the TPW with water distilled back into the cell are free from the influence of contaminants which remain in the annular volume.

Optionally, liquid water can be moved (decanted as opposed to distilled) from the annular volume directly into the cell body volume by placing the inverted cell into a warm bath enveloping the upper volume. This causes an increase in vapor pressure in the annular volume which moves the liquid water into the cell body volume. Maintaining the position of the dome transfer tube 109 below the liquid free surface of the water in the annular volume and slowly rotating the cell to a nearly horizontal orientation is important during this process. It decreases the hydrostatic head of the liquid water in the cell body volume which allows transfer of substantially all of the liquid water (and contaminants) into the cell body volume. Realization of the TPW with the decanted water will contain contaminants leached from the glass envelope over time, providing a method of quantifying the level of contamination which has taken place over the life of the cell.

While various embodiments of the present invention have been described, the invention may be modified and adapted to various operational methods to those skilled in the art. Therefore, this invention is not limited to the description and figures shown herein, and includes all such embodiments, changes, and modifications that are encompassed by the scope of the claims.

I claim:

1. A triple point of water cell with an attached storage volume facilitating water purification comprising:
   A) an inner tube that is closed at one end and open at the other end,
   B) an outer tube that is closed at one end and attached to a transfer tube at the other end,
   C) a storage volume having a central opening,
   D) said inner tube is positioned inside said outer tube thereby creating a water cell volume between said inner tube and said outer tube,
   E) said central opening, said inner tube, and said outer tube are substantially coaxially aligned,
   F) said transfer tube that is connected between said water cell volume and said storage volume,
   G) said transfer tube extends into said storage volume and serves to transfer water into said storage volume, and
   H) an end of said transfer tube extends above a water liquid free surface level of said storage volume when said storage volume contains substantially all of cell body water contained in said triple point of water cell.

2. The triple point of water cell according to claim 1, further comprising:
   A) a dome attached to said storage volume,
   B) said dome having an additional volume connected to said storage volume,
   C) said dome positioned above said liquid free surface, and
   D) said transfer tube is additionally routed to said additional volume.

3. The triple point of water cell according to claim 2, wherein said central opening is substantially shaped as a cylinder and said storage volume is an annular volume.

4. The triple point of water cell according to claim 3, wherein said dome is positioned on a top surface of said annular volume.

5. The triple point of water cell according to claim 1, further comprising:
   A) a McLeod gauge attached to an interior surface of said storage volume,
   B) said McLeod gauge is positioned to allow capture of a portion of the contents of said storage volume above said free surface.

6. A method of purifying cell body water in a triple point of water cell comprising:
   A) providing a triple point of water cell comprising:
      a) an inner tube that is closed at one end and open at the other end,
      b) an outer tube that is closed at one end and attached to a transfer tube at the other end,
      c) a storage volume having a central opening,
      d) said inner tube is positioned inside said outer tube thereby creating a water cell volume between said inner tube and said outer tube,
      e) said central opening, said inner tube, and said outer tube are substantially coaxially aligned,
      f) said transfer tube is connected between said water cell volume and said storage volume,
      g) said transfer tube extends into said storage volume and serves to transfer water into said storage volume, and
      h) an end of said transfer tube extends above a water liquid free surface level of said storage volume,
   B) warming said cell body water until it becomes liquid,
   C) rotating and holding said triple point of water cell until substantially all of said cell body water drains into said storage volume,
   D) rotating and holding said triple point of water cell until said substantially all of cell body water drains from said transfer tube into said storage volume,
   E) rotating said triple point of water cell so that said storage volume is above said water cell volume, and F) cooling said water cell volume causing a reduction of vapor pressure in said cell water volume thereby enabling said cell body water to return to said water cell volume by movement of water vapor between the two volumes.

7. The method of claim 6, further comprising:
A) a dome attached to said storage volume,
B) said dome having an additional volume connected to said storage volume,
C) said dome positioned above said liquid free surface, and
D) said transfer tube is additionally routed to said additional volume.

8. The method of claim 7, wherein said central opening is substantially shaped as a cylinder and said storage volume is an annular volume.

9. The method of claim 8, wherein said dome is positioned on a top surface of said annular volume.

10. The method of claim 6, further comprising:
A) a McLeod gauge attached to an interior surface of said storage volume,
B) said McLeod gauge is positioned to allow capture of a portion of the contents of said storage volume above said free surface when said cell body water is drained from said water cell volume into said storage volume when said triple point of water cell is inverted.

\* \* \* \* \*